United States Patent Office 3,575,931
Patented Apr. 20, 1971

3,575,931
POLYETHYLENE TEREPHTHALATE MOLDING COMPOSITIONS CONTAINING DISPERSIBLE NUCLEATING AGENTS
Norman Sherman, Succasunna, N.J., assignor to Allied Chemical Corporation, New York, N.Y.
No Drawing. Continuation of application Ser. No. 825,123, May 6, 1969. This application Apr. 6, 1970, Ser. No. 23,098
Int. Cl. C08g 17/06
U.S. Cl. 260—75
9 Claims

ABSTRACT OF THE DISCLOSURE

Polyethylene terephthalate containing dispersible nucleating agents which are solids up to 140° C. and which melt below 225° C. such as metallic stearates, chlorides and highly polar organic compounds can be injection molded. Shaped articles have improved impact resistance.

---

This application is a streamlined continuation of my copending application Ser. No. 825,123, filed May 6, 1969, and now abandoned.

This invention relates to polyethylene terephthalate molding compositions and to an improved process for preparing shaped articles from polyethylene terephthalate.

BACKGROUND OF THE INVENTION

Crystalline polyethylene terephthalate has excellent physical properties and in particular has outstanding thermal stability due to its high melting point, and dimensional stability due to its low moisture absorption. These properties permit use of polyethylene terephthalate for high temperature mechanical applications requiring close tolerances; for example, for electrical applications and for load bearing gears.

However, polyethylene terephthalate crystallizes slowly from the melt, which has limited the use of this polymer for articles formed by injection molding equipment; further, molded articles of polyethylene terephthalate have internal stresses in part caused by non-uniform spherulite growth and longer crystallization times. This confers low ductility and low impact resistance to low or high molecular weight polyethylene terephthalate.

The addition of a nucleating agent reduces crystallization time by providing a large number of sites which initiate crystal formation. A suitable nucleating agent must promote rapid crystallization under conditions of rapid cooling from the melt, such as occurs in injection molding. The time required for crystallization to begin is referred to as crystallization induction time. Since crystallization is also dependent upon polymer chain mobility, the molecular weight of the polymer is also a factor in crystallization, and higher molecular weight, long chain polymers will have a longer induction time than lower molecular weight polymers. Thus, a nucleating agent which is readily dispersible in molten polyethylene terephthalate and which is highly effective at low concentration to promote crystal formation in polyethylene terephthalate is highly desirable to increase molding rates and to reduce internal stress in the formed articles, thereby improving impact resistance.

It is known that certain liquid materials or liquids in combination with finely divided solid metals, metal oxides, or metal salts promote the crystallization of polyethylene terephthalate. For example, one commercial polyethylene terephthalate molding compound contains benzophenone and talc as nucleating agents. However, low boiling liquids heretofore known as nucleating agents and solid nucleating agents present problems of incorporation into the molten polymer and are difficult to disperse uniformly in the polymer.

SUMMARY OF THE INVENTION

It is an object of the present invention to provide polyethylene terephthalate compositions suitable for molding.

It is another object to provide nucleating agents for polyethylene terephthalate which are readily dispersible and have improved crystallization induction times.

Further objects will become apparent from the following detailed description thereof.

We have found that by dispersing certain nucleating agents in molten polyethylene terephthalate, crystallization induction time will be greatly lowered so as to allow the formation of shaped articles of polyethylene terephthalate in comparatively short molding cycles which are dimensionally stable and which have improved impact resistance.

DETAILED DESCRIPTION OF THE INVENTION

The nucleating agents useful in the invention are solids at temperatures from room temperature up to about 140° C. but they liquefy below polyethylene terephthalate melt temperatures (>255° C.) and thus are readily and uniformly dispersible with molten polyethylene terephthalate in a minimum of mixing time. The dispersibility of these agents can be further improved by dissolving the nucleating agents in a solvent, which can be a nonvolatile solvent, i.e. boiling over about 140° C., which is inert to polyethylene terephthalate. Suitable solvents include for example polyethylene and polypropylene glycols, polar silicone fluids, polyethylene glycol stearates, esters such as the trimellitic esters, amides such as methylene bis (stearamide), low molecular weight oxidized polyethylene waxes and the like. The high molecular weight alkylene glycols such as polyethylene glycols are particularly suitable. The solid nucleating agents can be admixed with up to about 90% of solvent.

The nucleating agents found suitable for use in the invention include metal salts of carboxylic acids such as zinc, lead, calcium, barium, sodium, potassium and cupric stearate; metal salts of inorganic acids such as silver nitrate and stannous chloride; and highly polar organic compounds such as p-hydroxybenzoic acid, tetrachlorophthalic anhydride, inositol and phthalimide. Zinc stearate and p-hydroxybenzoic acid are preferred.

The nucleating agents can be be added to polyethylene terephthalate in amounts of from about 0.1 to 2%, preferably from about 0.2 to 1% by weight of the polymer. At least about 0.1% of nucleating agent will be required to significantly reduce crystallization induction times in the polymer, whereas when more than about 2% is added, little additional nucleating effect is noted. Large amounts of additives may have an adverse effect on polymer properties.

The nucleating agent must be dispersed uniformly throughout the polyethylene terephthalate in order to obtain the benefits of the invention. Molten polyethylene terephthalate and the nucleating agent can be simply mixed together until a good dispersion is obtained. According to the preferred mode of practicing the invention, the polyethylene terephthalate in the form of granules, chips, pellets and the like, and the nucleating agent which can be in finely divided form or in the form of a solution or dispersion, are charged to a single or double screw extruder wherein the polymer is melted and the additive dispersed therein in a single step. The resultant composition can be fed directly to a mold or can be cooled, pelletized and stored for subsequent molding.

While the compositions of the invention are particularly suitable for shaping in injection molding equipment, they can also be extruded through a suitable die to form sheets, tubes, rods, fibers, films and the like and they can be cast to form film and sheet. They can also be shaped into useful articles in rotational casting equipment.

While the invention has been described in terms of polyethylene terephthalate homopolymer, the term polyethylene terephthalate as used herein is meant to include copolymers of polyethylene terephthalate such as copolymers containing up to about 20% of a polyester prepared from an aromatic dicarboxylic acid other than terephthalic acid, such as isophthalic acid, or from an alkylene glycol other than ethylene glycol such as propylene glycol. Polyethylene terephthalate useful for molding compounds has an intrinsic viscosity of from 0.4 to 2.0, preferably from 0.6 to 1.6.

In addition to the additives of the invention, the polyethylene terephthalate resin can also contain conventional fillers, pigments, mold release agents and the like.

The shaped articles formed from the compositions of the invention can be further treated, as by heating below the polymer melting point at from 80–150° C., which may improve impact resistance and ductility of the articles.

The invention will be further illustrated by the following examples, but the invention is not meant to be limited to the details described therein. In the examples, all parts and percentages are by weight.

In the examples, intrinsic viscosity was determined from solutions of polyethylene terephthalate in a mixture of equal parts by weight of sym-tetrachloroethane and phenol by standard means. A minimum of five polymer concentration levels were employed.

Gardner impact is determined by the following procedure: molded plaques 2 x 2″ and 16 mils thick are set on a circular support having an outer diameter of 2″. A tup having a diameter of ⅝″ is placed on the sample and a two pound weight is dropped from a slotted tube from various heights. The number of failures of 50–60 samples at various levels are recorded and the average 50% failure is reported.

Izod impact was determined according to ASTM test D256; ultimate tensile strength and elongation were determined according to ASTM test D638; and flexural modulus and flexural yield strength were determined according to ASTM test D790.

EXAMPLE 1

Ten parts of polyethylene tetraphthalate having an intrinsic viscosity of 0.73 were charged to a reactor heated at 280° C. A nucleating agent was added (0.1 part, 1%) and the mixture stirred under nitrogen. After two minutes the stirrer blade (coated with polymer) was withdrawn and crystal formation induced by inserting the blade into an upper chamber under a gentle stream of nitrogen for 90 seconds. The polymer was then quenched for five minutes in a Dry Ice-acetone bath. The coating on the blade was examined visually. A completely opaque coating indicates a greater than 20% crystalline polymer.

The following additives gave a completely opaque coating:

zinc stearate
calcium stearate
barium stearate
sodium stearate
cupric stearate
potassium stearate
lead stearate
stannous chloride
silver nitrate
tetrachlorophthalic anhydride
p-hydroxybenzoic acid
phthalimide
inositol The same experiment repeated with a polyethylene terephthalate control gave only a 30–40% opaque coating (less than 10% crystalline polymer).

EXAMPLE 2

The procedure of Example 1 was followed, except that only 0.05 part of each agent was added. The following additives gave a completely opaque coating:

zinc stearate
lead stearate
cupric stearate
p-hydroxybenzoic acid
phthalimide

EXAMPLE 3

The procedure of Example 2 was followed except that the crystallization induction time was reduced to 75 seconds using the following as nucleating agents:

(1) 0.4% zinc stearate
(2) 0.4% zinc stearate as a 13% dispersion in polyethylene glycol having an average molecular weight of 400;
(3) 0.4% p-hydroxybenzoic acid as a 13% solution in polyethylene glycol having an average molecular weight of 400.

All of these nucleating agents gave a 100% opaque film after quenching for five minutes.

EXAMPLE 4

Following the general procedure of Example 1, polyethylene terephthalate having an intrinsic viscosity of 0.95 and containing 0.4% zinc stearate was prepared. The crystallization time was 60 seconds. The resultant film was completely opaque.

A comparison was made with polyethylene terephthalate having an intrinsic viscosity of 1.1 containing about 1% of talc and about 0.3% of benzophenone. Crystallization induction time was 60 seconds. The resultant film gave only 50% opacity.

Example 5

A dispersion of 0.4% zinc stearate in polyethylene terephthalate having an intrinsic viscosity of 0.95 was made by charging polyethylene terephthalate pellets and the additive to a single screw extruder maintained at an average temperature of 270° C. Average residence time in the extruder was about 2 minutes.

The extruded product was pelletized and subjected to a single reciprocal screw injection molding cycle at a mold temperature of 280° F. under pressure of 800 p.s.i. for 20 seconds. The temperature at the nozzle and the front to center zones of the mold were 400° and 500° F. respectively. The holding and screw back pressures were maintained at 500 p.s.i. The overall molding cycle was 50 seconds. The molded article had a Gardner impact strength of 20 inch-opunds and an intrinsic viscosity of 0.75.

A molded article prepared in a similar manner except using 1% talc and 0.3% benzophenone as nucleating agents had an intrinsic viscosity of 0.92 and gave a Gardner impact strength of only 19 inch-pounds.

These results show that the nucleating agents of the present invention are more efficient in relieving internal stresses than known polyethylene terephthalate compositions.

Example 6

This example demonstrates various method of incorporating the nucleating agents of the invention into polyethylene terephthalate.

Finely divided polyethylene powder (about 72 mesh, U.S. Standard Sieve series) was admixed with 0.3% of zinc stearate in a mixer at room temperature. The resultant mixture was charged to a reciprocating screw type injection molding machine. The molded articles had an intrinsic viscosity of 0.61 and Gardner impact strength of 9 inch-pounds.

0.25% of zinc stearate was added to molten polyethylene terephthalate in a Ko-Kneader extruder-mixer of Baker-Perkins and the melt stream cooled and pelletized. The pellets were molded in a manner similar to that above. The molded articles had an intrinsic viscosity of 0.68 and also had a Gardner impact strength of 9 inch-pounds.

Example 7

Induction of crystallinity of samples of polyethylene terephthalate of varying intrinsic viscosity containing various crystallization aids were prepared and compared by differential scanning calorimetry at a cooling rate of 10° C. per minute. The data are summarized in the table below:

TABLE

| Additive | Intrinsic viscosity of polyethylene terephthalate | T-1 temperature crystallinity is initiated, ° C. | T-2 temperature crystallinity is complete, ° C. | Average temperature of crystallization ° C. | T-1 minus T-2, ° C. |
|---|---|---|---|---|---|
| (1) .25% zinc stearate | 0.68 | 210 | 194 | 202 | 16 |
| (2) .25% zinc stearate | 0.92 | 218 | 197 | 209 | 21 |
| (3) 0.3% benzophenone and 1.0% talc | 0.84 | 217 | 195 | 207 | 22 |
| (4) 0.3% benzophenone and 1.0% talc | 1.05 | 225 | 190 | 207 | 35 |
| (5) None | 0.73 | 211 | 180 | 198 | 31 |
| (6) None | 0.97 | 199 | 157 | 178 | 42 |

Thus, the additives of the invention promote faster crystallization than known additives for polyethylene terephthalate of similar molecular weight.

The physical properties of molded specimens are excellent. Molded specimens of polyethylene terephthalate having an intrinsic viscosity of 0.92 containing 0.25% of zinc stearate had the following properties: ultimate tensile strength 9600 p.s.i.; ultimate elongation 36%; flexural modulus 500,000; flexural yield strength 20,100; notched Izod impact 0.7; and Gardner impact 20 inch-lbs.

I claim:
1. A molding composition comprising polyethylene terephthalate having an intrinsic viscosity of from 0.4 to 2.0 and from 0.1 to 2.0% by weight of a nucleating agent dispersed therein selected from the group consisting of stannous chloride, silver nitrate, tetrachlorophthalic anhydride, p-hydroxybenzoic acid, phthalimide and inositol.
2. A composition according to claim 1 additionally containing a non-volatile solvent.
3. A composition according to claim 1 wherein said polyethylene terephthalate has an intrinsic viscosity of from 0.6 to 1.6.
4. A composition according to claim 1 wherein said nucleating agent is present in an amount of from 0.2 to 1.0% by weight of polyethylene terephthalate.
5. A composition according to claim 1 wherein said polyethylene has an intrinsic viscosity of from 0.6 to 1.6, and said nucleating agent is present in an amount of from 0.2 to 1.0% by weight of polyethylene terephthalate.
6. A composition according to claim 5 wherein said nucleating agent is phthalimide.
7. A shaped article of the composition of claim 1.
8. A shaped article of the composition of claim 5.
9. A shaped article of the composition of claim 6.

References Cited

UNITED STATES PATENTS

| 2,993,873 | 7/1961 | Heinrich et al. | 260—22 |
| 3,260,689 | 7/1966 | Kibler et al. | 260—22 |

OTHER REFERENCES

Chemical Abstracts, vol. 53, No. 3, Feb. 10, 1959, pp. 2148h–2149h.

DONALD E. CZAJA, Primary Examiner

R. W. GRIFFIN, Assistant Examiner

U.S. Cl. X.R.

260—28, 31.6, 31.8, 32.6